Sept. 17, 1963  K. A. COOL ETAL  3,104,146
RECORDING DEVICE
Filed March 6, 1959  2 Sheets-Sheet 1
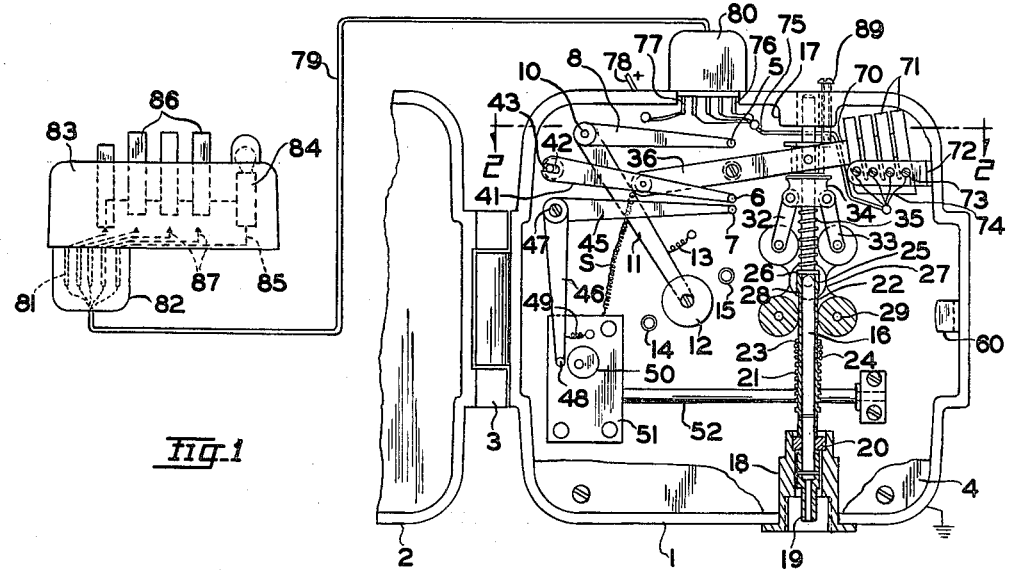
INVENTOR.
KENNETH A. COOL
SAMUEL K. TAYLOR
BY
Oberlin, Maky, & Donnelly
ATTORNEYS Sept. 17, 1963  K. A. COOL ETAL  3,104,146
RECORDING DEVICE
Filed March 6, 1959  2 Sheets-Sheet 2
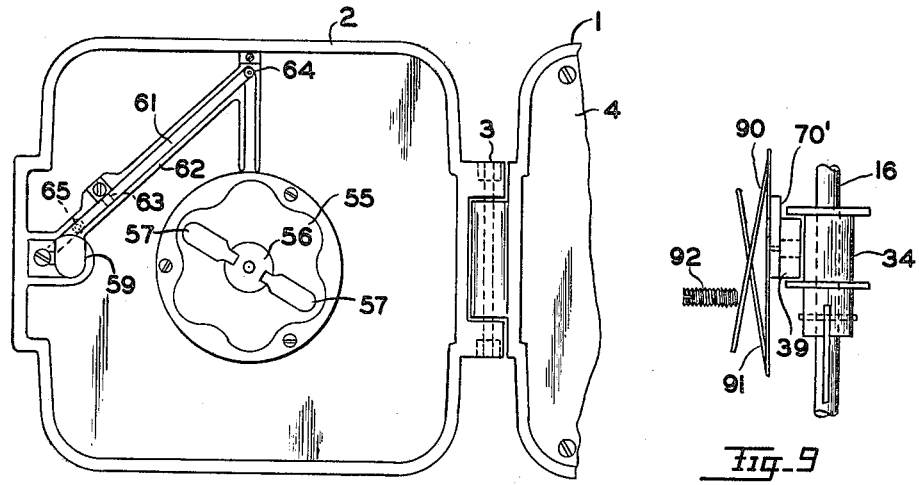
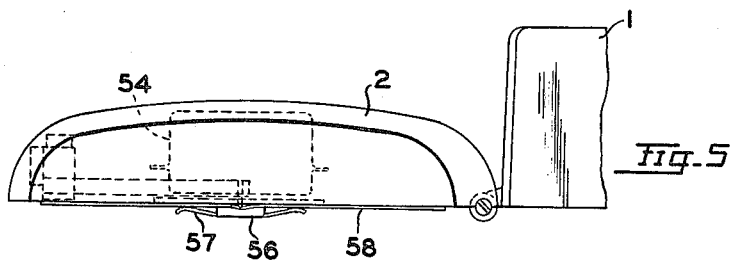
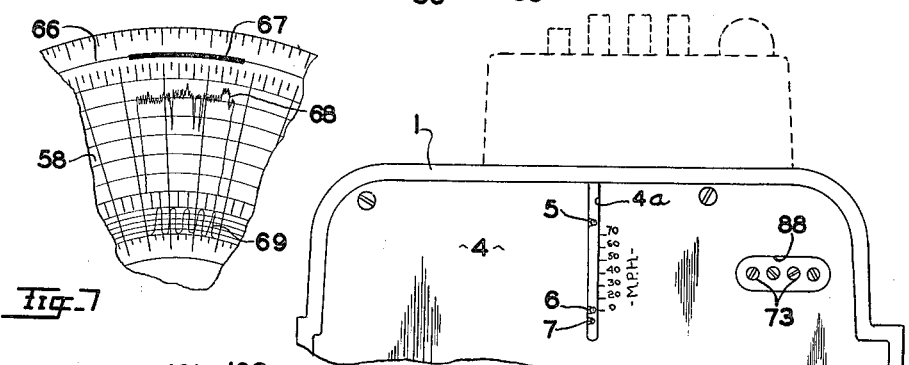
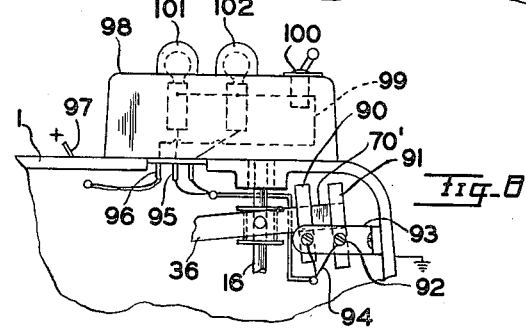
INVENTOR.
KENNETH A. COOL
SAMUEL K. TAYLOR
BY
Oberlin, Maky, & Donnelly
ATTORNEYS

United States Patent Office 3,104,146
Patented Sept. 17, 1963

3,104,146
RECORDING DEVICE
Kenneth A. Cool, Pepper Pike, and Samuel K. Taylor, Cleveland Heights, Ohio, assignors to The Service Recorder Company, Cleveland, Ohio, a corporation of Ohio
Filed Mar. 6, 1959, Ser. No. 797,755
13 Claims. (Cl. 346—18)

This invention relates to a recording device which is, at least in part, driven by a shaft adapted for such external connection that the shaft speed of rotation serves as a measure of the condition to be surveyed and recorded.

The preferred embodiment of the invention to be described hereinbelow was conceived and adapted principally for use in automotive vehicles, and the objects of the invention will be more readily understood if the function of this particular unit is first briefly considered, for purposes of illustration and not by way of limitation. In its most complete form, such recorder is designed to provide a time record of the intervals of operation of the vehicle, a continuous record of either the vehicle speed or engine speed during such intervals, and, where the vehicle speed is recorded, a further record from which the distances traveled can be computed. We have been particularly concerned with the mechanism for producing the speed record, the aforementioned shaft being utilized for such purpose and adapted to be connected to the speedometer shaft of the vehicle to be driven by the latter.

The recorder must of course include mechanism for producing oscillation of a stylus or other appropriate marking instrument in response to rotation of the shaft and, for a number of reasons, it is preferred to employ a fly-weight assembly on the order of a centrifugal governor to convert the rotary motion available to generally linear movement, which can then be used through suitable linkage to develop the oscillatory motion desired. The fly-weight assembly will, when rotating, have considerable inertia and direct connection of the assembly to the shaft presents the danger of overloading the shaft and possibly breaking the same in the event that the shaft speed of rotation changes rapidly. For example, a recorder having a direct connection of the fly-wheel assembly and shaft could not, as a practical matter, be used in a truck equipped with a two-speed rear axle, such drive necessitating a gear box in the speedometer shaft and a control to change the ratio thereof corresponding to shifts in the rear axle ratio. Such operation results in a significant immediate change in the speedometer shaft speed and accordingly in the speed of rotation of the recorder shaft coupled to such speedometer shaft; the inertia of the revolving fly-weight assembly would be sufficiently resistive to such change as to overload the shaft, most likely to the point of breaking. Such susceptibility to damage is eliminated in our recorder by the provision of a slip drive connection between the fly-weight assembly and the shaft, whereby relative movement of the two will occur in the event of and to relieve excessive torque in such driving connection.

More broadly stated, it is therefore a primary object of the invention to provide a recorder having a drive shaft and revolvable motion-translating means coupled thereto by a slip driving connection, thereby to protect the shaft against overload in the event of rapid changes in the shaft speed of rotation.

It has also been determined, in the vehicle recorder application considered, that sensible signals indicative of particular speed conditions which should be noted are desirable and helpful in calling to the attention of the driver the occurrence of such conditions. Such a signal can thus be employed to indicate the attainment of a predetermined speed and, in this case, it would be a definite advantage if the speed at which the signal is given could be varied and conveniently selected by the driver to best suit the driving conditions and other pertinent factors to be taken into account at any particular time.

Sensible signalling can also be utilized to indicate operation of the vehicle within a predetermined speed range, that is, with different and preferably contrasting signals provided at the upper and lower limits of such range.

It is therefore another object of our invention to provide a recorder having, in addition to its record-marking or recording means, a plurality of electrical control switches operated in response to preselected conditions of operation as determined by the recorder, with such switches being adapted to control external circuits such as might be used for sensible signalling.

Another object is to provide such a recorder in which the control switches are connected through selector switch means to a sensible signalling device.

A further related object is to provide a compact assembly of such selector switch means and signalling device which can conveniently be mounted either on the recorder or at a location remote therefrom. Another object of the invention is to provide a recorder having the aforesaid control switches in which the latter are utilized in combination with a signalling device to provide contrasting sensible signals to distinguish different conditions of switch response, whereby the limits of a predetermined range of operation can be separately indicated.

It is also an object of the invention to provide a recording device in which the slip-coupled mechanism for moving the marking instrument, on the order indicated, is also operative to actuate electrical control switches, with the related objectives of providing the various signalling operations discussed in the above through the agency of the thus actuated switches.

A further object of our invention is to provide a recorder for use in automotive vehicles and the like having slip-coupled mechanism for producing a speed record and, in combination, means for recording the time periods of operation of the vehicle. Another object is to provide such a vehicle recorder having combined therein means for producing a third record from which the distance travelled by the vehicle can be computed.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is an elevational view of a recorder made in accordance with our invention, with the cover thereof open and partially broken away and part of the drive mechanism shown in longitudinal section;

FIG. 2 is a horizontal sectional view of this recorder taken on the plane indicated by the line 2—2 in FIG. 1;

FIG. 3 shows a detail of the assembly on an enlarged scale;

FIG. 4 is an elevational view similar to FIG. 1, but with the cover shown completely and the main body of the recorder fragmented;

FIG. 5 is a top plan view of that much of the structure which appears in FIG. 4;

FIG. 6 shows in elevation the upper portion of the main body of the recorder with the closure plate which is shown broken in FIG. 1 in place over this area;

FIG. 7 shows a fragment of a record chart or disc used in the recorder and having thereon, in simplified form, the various traces which are produced;

FIG. 8 is a fragmentary view of the recorder equipped with a control switch and signal device combination different from the one appearing in FIG. 1; and FIG. 9 shows a detail of the switch assembly used in the FIG. 8 form on an enlarged scale.

Referring now to the drawings in detail, it will be evident that FIGS. 1 and 4 are complementary in the sense that when taken together they show the complete recorder in open condition as viewed from the front, with FIGS. 2 and 5 likewise together showing the complete construction as appearing in the indicated horizontal planes. The recorder will thus be seen to comprise a main casing 1 and a recessed cover 2 attached to such casing by a vertical hinge 3 at a front side edge of the casing. As will appear, the casing contains the various drive, operating and control mechanisms, normally obscured by a closure plate 4 at the front of the casing which is broken away in FIG. 1, while the cover 2 carries the record sheet, the driven support therefor and certain other related elements.

This illustrated embodiment of our recording device is, as indicated earlier, designed to be used in automotive vehicles and the like, and as shown in FIG. 1 there are three separate marking instruments 5, 6 and 7, respectively, arranged in a vertical row in an upper central portion of the casing and projecting horizontally forwardly therefrom. The illustrated elements are styli adapted to form traces on a wax-coated record disc as will be explained more in detail below, but they could as well be pens or other types of markers cooperable with the record sheet employed to trace lines on the latter. The top stylus 5 is fixed to one end of a generally horizontal arm 8 secured at its other end to a sleeve 9 which is rotatable on a rod or fixed shaft 10 extending forwardly from the rear wall of the casing. A downwardly extending lever 11 is fixed to the other or inner end of such sleeve and carries a weight 12 at its lower end, the lever being normally centered by a spring 13 between spaced stops 14 and 15 projecting forwardly into and thus defining limits along the arc of movement of the lever. This assembly is thus responsive to vibration of the recorder, movement of the pendulum thus formed causing the top stylus 5 to oscillate rapidly over a small arc. Such stylus is therefore capable of providing a trace which will distinguish quiescent and operating (vibration producing) conditions of the vehicle.

The drive of the second stylus 6 is derived from a shaft 16 extending vertically within the casing 1, with its upper end journalled in a protuberance 17 provided therefor at the underside of the top wall of the casing. The lower end of this shaft enters a socket 18 fitted in an opening in the bottom wall of the casing and, within this socket, an adaptor 19 designed for driving connection with an external flexible shaft, not shown, is secured to the end of the shaft. The recorder shaft is centered in the socket by a bearing 20 resting on a shoulder of the latter and a worm 21 is fixed on the shaft, above such bearing, for a purpose to be described. Continuing upward, there is a fairly long sleeve 22 on the shaft, not fixed thereto, and this sleeve has an intermediate integral ring 23, with a coil spring 24 surrounding the portion of the same below such ring and bearing at its lower end against the upper end of the fixed worm.

A short sleeve 25 is disposed on the shaft 16, without being rotatively secured thereto, between the upper end of the long sleeve 22 and an integral ring 26 on the shaft. The sleeve 25 is the center support of a fly-weight assembly comprising a pair of arms 27, 28 pivoted centrally at diametrically opposite points on such support. The opposed outer ends of the several arms support horizontal shafts 29, and each such shaft carries weights in the form of two solid cylindrical pieces 30 between the arm connections to the shaft and frusto-conical end pieces 31 respectively outboard of such connections. Two links 32, 33 are pivoted centrally on the two top shafts 29 and extend upwardly to a collar 34 slidable on the shaft, the upper ends of the links being pivoted on pins carried in diametrical opposition by such collar. A coil spring 35 surrounds the shaft between the fixed ring 26 theron and the underside of the collar 34, this spring urging the latter upwardly and thereby axially extending the fly-weight assembly.

Such assembly is of course similar to a centrifugal governor, and it will be understood that rotation thereof causes the weights to fly from the axial center of the drive shaft 16 under the influence of centrifugal force, pulling the collar 34 down against the force of the spring 35, with such outward movement of the weights and consequent axial shifting of the collar proportional to the speed of rotation.

It will also be seen that rotation of the drive shaft 16 is transmitted to the fly-weight assembly through the frictional engagement of the top surface of the short sleeve 25, which is the center support of the assembly, and the bottom surface of the ring 26 on the shaft against which such sleeve is forced by the spring 24. As the speed builds up, compression of the spring 35 increases the loading or force of contact between such surfaces, acting together as a slip clutch, and this drive connection is designed to slip or permit relative movement of the shaft and the fly-weight assembly upon the occurrence of predetermined torsional stress well below that which would overload the shaft. In other words, the shaft speed of rotation can change rapidly, without danger of overloading the shaft as the result of the inertia of the revolving weights tending to resist such change. When the revolving weights have either lost or picked up momentum, as the case may require, the slip of course disappears.

The axial shifting of the collar 34 in response to rotation of the recorder drive shaft 16 is employed to oscillate the second stylus 6 by means of a link 36 pivoted intermediate its ends on a shaft 37 projecting forwardly from the back wall of the casing, against a spacer sleeve 38 on the same. At one side of this pivot, the right as viewed in FIG. 1, the link 36 is pivotally connected to a shoe 39 secured to the collar 34 and, at its end on the opposite side of the pivot, there is a pivotal connection 40 to an intermediate point on an arm 41. The stylus 6 is fixed to one end of this arm and the other end of the arm has a slot 42 in which a guiding and supporting pin 43 rides, the latter being fixed in the end of a standard 44 which projects from the casing back wall. A spring S tends to stabilize the arm 41 by drawing the same resiliently downwardly.

The second stylus is therefore caused to oscillate in response to the speed of rotation of the recorder drive shaft, which as indicated earlier may for automotive use be connected through a flexible shaft and appropriate power take-off to the conventional speedometer shaft of the vehicle. With such connection, the motion traced by the stylus can be used to record the vehicle speed in miles per hour. By using a different power connection appropriate for the purpose, this stylus can be made to indicate engine revolutions per minute.

In the three styli unit illustrated, however, the second stylus is used to record vehicle speed in the manner described, and the third stylus 7 is provided for the aforementioned record indicative of the distance traveled. The stylus 7 is thus mounted at the end of an arm 45 which together with a connected depending arm 46 and a pivotal support 47 at the point of connection of the two acts as a bell crank. The lower end of the depending arm 47 carries a rearwardly projecting pin 48 which is held by a spring 49 against the periphery of a cam disc 50 mounted eccentrically on the output shaft of a conventional gear reduction unit 51. The latter is driven by a shaft 52 extending along the back of the casing and having fixed thereon a worm wheel 53 in engagement with the worm 21 on the recorder drive shaft 16. The speed reduction is sufficient to permit readily ascertainable cycling of the stylus 7, with a cycle thereof representing a convenient distance measurement, for example, ten miles.

With regard now to the manner in which the record is prepared, a clock 54 is mounted centrally inside the recorder cover 2 and drives a pedestal 55, such clock being spring driven and capable of being wound by turning of the pedestal. The pedestal has a projecting central portion 56 and a pair of opposite snap wings 57 are hinged thereto, such wings being sprung against the front face of the pedestal when extended. This assembly constitutes a driven support for a record disc 58 (FIG. 5) having a central aperture placed over the pedestal projection, the wings 57 being withdrawn to permit the sheet to pass and then snapped against the sheet to hold the same firmly in place. The disc is preferably made of colored paper bearing suitable indicia and covered at the face engaged by the styli with a white coating of wax, relatively moving pressure contact of the styli against such coated surface displacing the wax along the lines traced thereby so that the color of the paper becomes visible therealong. Both the clock drive shown and this type of record disc are conventional and disclosed, for example, in U.S. Patent No. 2,051,986.

The cover 2 of the recorder is provided with a key lock having an inner latch 59 which engages behind an ear 60 of the main casing, and, as a tamperproof feature, we also provide means for punching a hole in the record disc upon each opening and closing of the cover. Such means comprises a lever 61 mounted in a channel 62 of the cover and pivoted at an intermediate point indicated at 63 for in and out movement with respect to the cover. A sharp pointed element or punch 64 is carried by and projects forwardly of the upper end of the lever behind the top center of the disc as indicated in FIG. 5, and below the pivot point, there is a spring 65 in the channel which normally urges the lower end portion of the lever outwardly, this last portion being behind the latch 59. With the cover in the open condition illustrated, the latch is engaged with such lower end of the lever 61 and cams the same inwardly against the spring 65 so that the punch moves forwardly against the back of the disc 58. Upon closure of the cover, the record disc is brought against the plate 4 at the front of the main casing 1 and the punch 64 continues and enters the upper end of a slot 4a in such plate or, in other words, is caused to pierce the disc. As shown in FIG. 6, the same slot accommodates the projection of the three styli into scribing contact with the disc for their respective marking operations previously described.

After the cover is closed and the lock actuated by its key to turn the latch 59 behind the ear 60, the lower portion of the punch lever 61 is freed by the latch and the spring 65 causes the upper end to retract, whereby the punch is withdrawn from the disc and the same is therefore free to turn. The same piercing action occurs when the cover is opened, since the necessary turning of the latch cams the punch lever in the manner set forth.

In the operation of this recorder, then, the record disc is engaged by the three styli with sufficient contact pressure for marking thereof and the disc is turned or driven past the styli by the clock mechanism. Three radially separated traces are thus produced to record the respective motions and hence responses of the styli as set forth hereinabove, which will be on the order of those appearing in the record fragment illustrated in FIG. 7.

It will be seen therefrom that the outer or time trace appears as a thin line 66 during quiescent or vibrationless periods, with the vibration caused by vehicle operation, for example, causing the top stylus 6 to oscillate so rapidly as to produce an apparently solid wide line 67. The intermediate trace 68 appears on a scale marked to show miles per hour, indicated by the amplitude or swing of the second stylus 6, while the third or innermost trace 69 is distinctly cyclic with the number of cycles representing the distance traveled; from the drive mechanism employed in this instance it will be appreciated that these cycles will be of the same amplitude but possibly varying in frequency.

In addition to providing such a permanent record, the mechanism for actuating the second stylus in response to the recorder shaft speed of rotation is utilized to actuate switches for the control of external electrical circuits, here provided for the control of sensible signalling means. Thus, in FIG. 1, the link 36 has an extension 70 to the side of its pivotal connection to the collar 34 removed from the region of the styli. This extension, which could just as well be a separate piece connected to move in a corresponding manner, carries four spring contacts 71 extending transversely and bent forwardly thereof in spaced relation. A bracket 72 secured to the side wall of the casing 1 extends adjacent the arcuate path through which such spring contacts are moved by the link extension when the link 36 is rocked as described above by the fly-weight assembly, and four screw contacts 73 are adjustably threaded through the bracket respectively to be engaged by the spring contacts. The screws will be insulated from the bracket, or the bracket insulated from the casing, and a wire 74 extends from each such screw through a conduit 75 to a conductive socket 76 of a terminal assembly mounted in an opening in the top wall of the casing. Such terminal assembly includes an additional socket 77 from which a wire 78 extends externally of the recorder for connection to an available electric potential source.

In FIG. 1, a multi-wire extension cord 79 is connected at one end to the casing terminal assembly by a plug 80 having pins respectively engaged in the sockets of the former, with the wires in the cord insulated from each other and one connected to each pin. The five wires in the cord connect respectively to the conductive sockets 81 of a female plug 82 at the other end of the cord and a wired box 83 having corresponding projecting pins is connected therethrough to such other terminal of the cord.

The box 83 mounts a signal lamp 84 having one side connected to a wire 85 and through the extension cord to the positive terminal socket 77 in the recorder, while the other side of the lamp is connected commonly to four movable switch contacts 86 of push-button type, which will of course be appropriately insulated for finger manipulation without shock. The box has four stationary contacts 87 respectively opposed to such movable contacts and connected through the circuits described to the four contact screws 73 in the recorder casing. Such push-button selector switch mechanism may be of any commercially available type, so this further detailed description of the construction is not necessary here.

It will be apparent that each spring contact 71 in the recorder and its associated screw 73 form an electrical control switch capable of energizing the signal lamp, the spring contacts being grounded through their support means to the casing for completion of the parallel circuits available from the supply through the control switches, selector switches and the lamp. The screws are adjusted, as shown best in FIG. 2, to different spacings from their associated spring contacts, so that the several such switches will be actuated at different points in the movement of the link extension 70. These screws are accessible through a slot 88 formed in the closure plate 4 of the recorder casing, as shown in FIG. 6, and there is a tapped hole in the top wall of the casing through which a screw 89 may be threaded to engage and actuate the collar 34, with the recorder disconnected or inoperative. The screw 89 thus permits the link extension to be moved as it would in operation to the different positions at which the control switches are to be actuated, and in each such adjusted position the screw contact 73 of the switch thus to be operative is adjusted to make contact with its associated spring contact 71. In this manner, the several switches are set and the adjusting screw 89 then removed from the casing. Since each push-button switch in the remote signal unit is in circuit with one of the recorder control switches, it will be obvious that a user of the recorder can select the particular condition of those available which he desires to be indicated by the illumination of the signal lamp 84. In the automotive use contemplated, the settings would indicate different speeds and the push-buttons appropriately marked to show the same for purposes of such selection.

It will also be seen that the extension cord 79 permits the signal unit and the recorder to be separately positioned should this prove necessary or advantageous in a particular use application. The terminals of the signal unit or box 83 are, however, capable of direct engagement with the casing terminal assembly for mounting of such box on the latter, if desired, such an assembly being indicated by the dashed outline of the box in FIG. 6.

In the modification shown in FIGS. 8 and 9, the link extension 70' carries two spring contacts 90 and 91 similar to the contacts on this order previously described but oppositely angularly directed, as best shown in FIG. 9, and two adjustable terminal screws 92 are mounted by bracket 93 respectively for wiping engagement therewith. Such screws are connected by wires 94 to the conductive sockets 95 of a terminal assembly, again mounted in the top wall of the casing, and there is a third such socket 96 to which the supply wire 97 from the potential source is connected. The screws 92 are again suitably insulated from the casing.

A signal unit 98 mounted on the top wall of the casing has three contact pins engaged in the sockets 95, 96 and is wired such that a first wire 99 leads from the supply socket 96 to a manual on-off switch 100 and from this switch to one side of each of two signal lamps 101 and 102, which will preferably be of different colors or enclosed by differently colored translucent caps. The other side of the lamp 101 is connected to the unit terminal pin engaged in one of the sockets 95, while the circuit for lamp 102 is completed by connection to the pin engaged in the other such socket, whereby with the switch 100 in its on position, the lamps are individually controlled by the recorder switch contacts.

It will be evident, from FIG. 9 particularly, that the relative disposition of the spring contacts 90 and 91 provides two separated and independently adjustable points of switch response or actuation along the arcuate path of movement of the link extension 70'. That is, preselected movement of the same in one direction will result in one such spring contact coming into engagement with its cooperable screw contact, with the other pair of such contacts brought together only after the extension is moved a predetermined extent in the opposite direction. An adjustable range of the conditions to which the recorder drive responds can thereby be established for sensible signaling, for example in the automotive application, the recorder shaft can be driven in response to engine speed, with the lamp 101 being red and illuminated when the engine is below a predetermined speed and the lamp 102 being green and illuminated when such speed exceeds an upper setting or limit. With such operation, both lamps are off when the engine is operating within the predetermined speed range; the same arrangement can of course also be used to signal vehicle speed.

It will accordingly be seen that our new recorder provides a protected, complete and permanent record of vehicle operation in the application thereof considered herein in detail, with the protection embracing both the mechanical drive mechanism employed as an operating feature and unauthorized opening of the recorder. Furthermore, the recorder mechanism which provides the response to shaft rotation and applies such motion to a tracing or marking function is also utilized in efficient manner for purposes of electric circuit switching, whether this last action be directed to signaling as described or to other related controls.

Other modes of applying the principle of the invention may be employed, change being made as regards the details described, provided the features stated in any of the following claims or the equivalent of such be employed.

We, therefore, particularly point out and distinctly claim as our invention:

1. In a recording device including a tracing element and a record sheet and the like, the two being cooperable to provide a record of the motion traced by such element, a drive shaft, revolvable motion-translating means operative to produce generally linear movement in response to rotation thereof, a movable support for such tracing element, means connecting said support to said motion-translating means to actuate the former responsively to the generally linear movement of the latter, friction clutch means for connecting the drive shaft to said motion-translating means to rotate the same, said friction clutch means protecting the shaft against overload by the revolving motion-translating means in the event of rapid changes in the shaft speed of rotation, and means for varying the frictional loading of said clutch means in response to changes in the speed of rotation of the motion-translating means.

2. In a recording device including a tracing element and a record sheet and the like, the two being cooperable to provide a record of the motion traced by such element, a drive shaft, revolvable motion-translating means operative to produce generally linear movement in response to rotation thereof, a movable support for such tracing element, means pivotally mounted relative to said support connecting said support to said motion-translating means to actuate the former responsively to the generally linear movement of the latter, sensible signal-producing means, means for operating said signal-producing means in response to different degrees of such generally linear movement of the motion-translating means, and friction clutch means for connecting the drive shaft to said motion-translating means to rotate the same, said friction clutch means protecting the shaft against overload by the revolving motion-translating means in the event of rapid changes in the shaft speed of rotation, and means for increasing the frictional loading of said clutch means in response to increase in the speed of rotation of the motion-translating means.

3. The combination set forth in claim 2 wherein the means for operating said signal-producing means comprises a series of electrical control switches, and a selector switch is connected in circuit with such switches and operative selectively to connect the same to the signal-producing means.

4. The combination set forth in claim 2 wherein said signal-producing means is operative to provide contrasting signals to indicate different conditions of operation of the recording device.

5. In a recording device having a casing, a drive shaft therein, and means for producing a record in response to rotation of said shaft, a plurality of electrical control switches in the casing, means for actuating said switches respectively in response to different shaft speeds of rotation, a terminal assembly in a wall of the casing having a series of sockets connected respectively with the control switches, a signal assembly including a lamp and plural selector switches, said signal assembly further having a series of projecting pins arranged correspondingly as the sockets of the casing terminal assembly and respectively connected to the plural selector switches and in circuit with said lamp, and a multi-wire connector having a female terminal at one end engaged with the pins of the signal assembly and a male terminal at the other end engaged with the terminal assembly of the casing, with the selector switches being selectively operative through said connector to place the lamp in circuit with one or another of the control switches, said connector providing remote positioning of the signal assembly and the correspondence of the pins thereof and the casing terminal assembly permitting the signal assembly alternatively to be directly connected to the casing.

6. In a recording device, a shaft, a revolvable fly-weight assembly adapted to be driven by said shaft and to vary in axial length in accordance with the speed of rotation of the same, a pivoted link connected to said assembly to be rocked thereby upon such change of length, an arm connected to said link for oscillation in response to such rocking of the link, a tracing element mounted on said arm, record sheet-means mounted with said tracing element bearing thereagainst, drive means for moving the record sheet means relative to the tracing element, friction clutch means rotatively connecting the shaft to the fly-weight assembly, said friction clutch means protecting the shaft against overloading due to inertia of the revolving fly-weight assembly when the shaft speed of rotation changes rapidly, and means for varying the frictional loading of said clutch means in response to changes in the speed of rotation of the fly-weight assembly.

7. A recording device as set forth in claim 6 wherein said means for varying the frictional loading of said clutch means includes spring means resisting axial contraction of the fly-weight assembly.

8. A recorder for use in automotive vehicles and the like, comprising a sheet on which it is desired to record a first trace indicating intervals of operation of the vehicle and a second trace indicating the speed of operation in such intervals, first and second marking elements bearing against said sheet respectively to produce such first and second traces on the same, drive means for moving the sheet at a constant rate past the marking elements, a pivoted arm on which the first marking element is mounted, vibration-responsive means for rocking said arm thereby to produce the first such trace, a shaft adapted to be driven by the speedometer shaft of the vehicle, a revolvable fly-weight assembly which changes in length in accordance with its speed of revolution, a friction clutch rotatively connecting said fly-weight assembly to said shaft, the assembly being thus driven by the shaft with the latter protected against overloading due to inertia of the revolving assembly in the event of quick changes in the shaft speed, means for varying the frictional loading of said clutch means in accordance with the speed of rotation of the fly-weight assembly, a pivoted link connected to the fly-weight assembly and rocked in response to changes in the length thereof, and a lever connected to said link to be oscillated by such rocking of the same, the second marking element being mounted on said lever and thereby actuated in response to the driving of the shaft to produce the second desired trace on the record sheet.

9. A recorder as set forth in claim 8 characterized further in that a third marking element is disposed to contact said sheet, and said third element is oscillated by means connected through speed-reducer means to the shaft to provide a third trace from which distance traveled may be computed.

10. A recorder as set forth in claim 8 wherein the friction clutch comprises first and second contacting elements one of which is fixed on the shaft and the other being capable of rotating relative to the shaft, and the means for varying the frictional loading of the clutch includes spring means actuated by the rotating fly-weight assembly to force together the contacting elements of the clutch.

11. A recorder as set forth in claim 10 wherein the contacting elements of the clutch are normally maintained in contact by additional biasing spring means.

12. In a recording device including a tracing element and a record sheet and the like, the two being cooperable to provide a record of the motion traced by such element, a drive shaft, a fly-weight assembly having a support sleeve and an end collar on the drive shaft, a friction element fixed on the shaft between said support sleeve and end collar, first spring means for urging the support sleeve against said fixed element, second spring means between the end collar and the fixed element, rotation of the fly-weight assembly causing the second spring means to be compressed and such compression serving to increase the frictional loading of the fixed element and sleeve support, a movable support for the tracing element, and means connecting said movable support to the fly-weight assembly to actuate the former in response to linear movement of the latter.

13. In a recording device including a tracing element and a record sheet and the like, the two being cooperable to provide a record of the motion traced by such element, a drive shaft, revolvable motion-translating means operative to produce generally linear movement in response to rotation thereof, a movable support for such tracing element, means connecting said support to said motion-translating means to actuate the former responsively to the generally linear movement of the latter, friction clutch means for coupling the drive shaft to the motion-translating means, said friction clutch means including relatively rotatable contacting elements, first spring means for normally maintaining such elements in contact, and second spring means actuated by the motion-translating means and operative to increase the pressure contact of said elements in response to an increase in the speed of rotation of the motion-translating means.

References Cited in the file of this patent

UNITED STATES PATENTS

| | | |
|---|---|---|
| 506,406 | McLauthlin et al. | Oct. 10, 1893 |
| 1,279,642 | Brady | Sept. 24, 1918 |
| 1,442,726 | Koski | Jan. 16, 1923 |
| 1,844,122 | Hoddy et al. | Feb. 9, 1932 |
| 1,928,505 | Schmelcher | Sept. 26, 1933 |
| 2,019,410 | Hallman | Oct. 29, 1935 |
| 2,245,784 | James | June 17, 1941 |
| 2,828,179 | Poncelet | Mar. 25, 1958 |
| 2,855,993 | Rahmel | Oct. 14, 1958 |
| 2,887,679 | Curva | May 19, 1959 |

FOREIGN PATENTS

| | | |
|---|---|---|
| 579,481 | Great Britain | Aug. 6, 1946 |